(12) United States Patent
Saito

(10) Patent No.: US 8,267,402 B2
(45) Date of Patent: Sep. 18, 2012

(54) MEDIUM REVERSING APPARATUS, IMAGE FORMING APPARATUS AND IMAGE READING APPARATUS

(75) Inventor: Takashi Saito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/098,011

(22) Filed: Apr. 29, 2011

(65) Prior Publication Data

US 2011/0206435 A1 Aug. 25, 2011

Related U.S. Application Data

(63) Continuation of application No. 12/362,561, filed on Jan. 30, 2009, now Pat. No. 7,954,806.

(30) Foreign Application Priority Data

Feb. 12, 2008 (JP) ................................. 2008-030736

(51) Int. Cl.
*B65H 39/10* (2006.01)
(52) U.S. Cl. .......... 271/301; 271/65; 271/186; 271/188; 271/209
(58) Field of Classification Search .................. 271/301, 271/65, 186, 188, 209
See application file for complete search history.

(56) References Cited

U.S. PATENT DOCUMENTS

| | | | |
|---|---|---|---|
| 3,934,872 A | 1/1976 | Honkawa |
| 3,954,261 A | 5/1976 | Greene et al. |
| 4,059,203 A | 11/1977 | Wright |
| 5,312,108 A | 5/1994 | Hayashi |
| 5,448,348 A | 9/1995 | Azeta |
| 5,534,989 A | 7/1996 | Rubscha et al. |
| 6,393,251 B2 | 5/2002 | Kono |
| 6,503,011 B2 | 1/2003 | Kono |

FOREIGN PATENT DOCUMENTS

JP 2002-104707 A 4/2002

OTHER PUBLICATIONS

Office Action Issued Sep. 13, 2010 in U.S. Appl. No. 12/362,561.

*Primary Examiner* — David H Bollinger
(74) *Attorney, Agent, or Firm* — Panitch Schwarze Belisario & Nadel LLP

(57) ABSTRACT

A medium reversing apparatus, an image forming apparatus and an image reading apparatus that respectively have the medium reversing apparatus are supplied capable of avoiding medium damage and medium load abnormality. In the medium reversing apparatus that conveys a sheet-like medium back and reverses obverse side and reverse side of the medium, a medium ejection opening is used for ejecting at least a part of the medium; an ejecting member at least ejects the part of the medium from the medium ejection opening and conveys the medium back; and a bend forming section is set at the outside edge portion of the ejecting member and bends the medium from a clamp face of the medium clamped by the ejecting member.

40 Claims, 10 Drawing Sheets

MEDIUM REVERSING APPARATUS, IMAGE FORMING APPARATUS AND IMAGE READING APPARATUS

CROSS-REFERENCE TO RELATED APPLICATIONS

This application is a Continuation of U.S. patent application Ser. No. 12/362,561, filed Jan. 30, 2009, which claims priority to Japanese Application No. 2008-030736, filed Feb. 12, 2008, the entire disclosures of which are incorporated herein by reference.

BACKGROUND OF THE INVENTION

The present invention relates to a medium reversing apparatus, and an image forming apparatus and an image reading apparatus that respectively comprise the medium reversing apparatus.

In a conventional image forming apparatus that forms images on both sides of a medium and has a so-called duplex printing function, a medium reversing apparatus is used to reverse an image forming face of a medium on which an image is formed by an image forming section and to convey the medium whose image forming face has been reversed to the image forming section again.

The medium reversing apparatus mentioned above works in this way: firstly, it enables an ejecting roller that is set near a medium ejection opening of image forming apparatus to rotate in a direction of medium ejection in order to allow a part of medium to be ejected from a medium ejection opening. After a predetermined part of medium is ejected from a medium ejection opening, the ejecting roller in the medium reversing apparatus rotates in an opposite direction of medium ejection in order to convey the medium back. Lastly, the medium reversing apparatus conveys the medium that is conveyed to the inside of the image forming apparatus again to a reversal route so as to achieve a reversal of medium.

It may refer to patent original document 1 of Japan patent publication 2002-104707.

However, there is a problem that load abnormality of papers that are loaded in ejection tray occurs.

BRIEF SUMMARY OF THE INVENTION

It is, therefore, an object of the invention to provide a medium reversing apparatus, and an image forming apparatus and an image reading apparatus that respectively comprise the medium reversing apparatus, that can inhibits the load abnormality of papers that are loaded in ejection tray.

That is, In view of these practical situations, a subject of the present invention is to provide a medium reversing apparatus that can avoid a medium damage caused because a front part of medium hangs down in the direction of gravity due to its dead weight after it is ejected from medium ejection opening; and can avoid medium load abnormality caused when medium ejected from a medium ejection opening pushes out a medium that has been ejected to an ejection tray; or the like.

A first aspect of the invention is to provide a medium reversing apparatus that conveys a sheet-like medium back and reverses obverse side and reverse side of the medium, the medium reversing apparatus comprises a medium ejection opening from which at least a part of the medium is ejected; an ejecting member that at least ejects the part of the medium from the medium ejection opening and conveys the medium back; and a bend forming section that is set at the outside edge portion of the ejecting member and bends the medium from a clamp face of the medium clamped by the ejecting member.

A second aspect of the invention is to provide an image forming apparatus, the image forming apparatus comprises a medium reversing apparatus that conveys a sheet-like medium back and reverses obverse side and reverse side of the medium; and an image forming section that forms an image on the medium, wherein the medium reversing apparatus includes a medium ejection opening from which at least a part of the medium is ejected; an ejecting member that at least ejects the part of the medium from the medium ejection opening and conveys the medium back; and a bend forming section that is set at the outside edge portion of the ejecting member and bends the medium from a clamp face of the medium clamped by the ejecting member.

A third aspect of the invention is to provide an image reading apparatus, the image reading apparatus comprises a medium reversing apparatus that conveys a sheet-like medium back and reverses obverse side and reverse side of the medium; and a reading section used to read image formed on the medium, wherein the medium reversing apparatus includes a medium ejection opening from which at least a part of the medium is ejected; an ejecting member that at least ejects the part of the medium from the medium ejection opening and conveys the medium back; and a bend forming section that is set at the outside edge portion of the ejecting member and bends the medium from a clamp face of the medium clamped by the ejecting member.

A fourth aspect of the invention is to further provide a medium reversing apparatus that conveys a sheet-like medium back and reverses obverse side and reverse side of the medium, the medium reversing apparatus comprises a first medium ejection opening from which at least a part of the medium is ejected; a second medium ejection opening from which the medium is ejected to a loading section for loading the medium; an ejecting member that at least ejects the part of the medium from the first medium ejection opening and conveys the medium back; and a bend forming section that is set at the outside edge portion of the ejecting member and bends the medium from a clamp face of the medium clamped by the ejecting member.

EFFECT OF THE INVENTION

According to the medium reversing apparatus of the invention, it is possible to avoid a medium damage caused by that the front part of medium hangs down in the direction of gravity due to its dead weight after the front part is ejected from a medium ejection opening and to avoid medium load abnormality caused when a medium ejected from the medium ejection opening pushes out a medium having been ejected to an ejection tray, or the like.

The above and other objects and features of the present invention will become apparent from the following detailed description and the appended claims based on the accompanying drawings.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Embodiment 1

Figure 1:
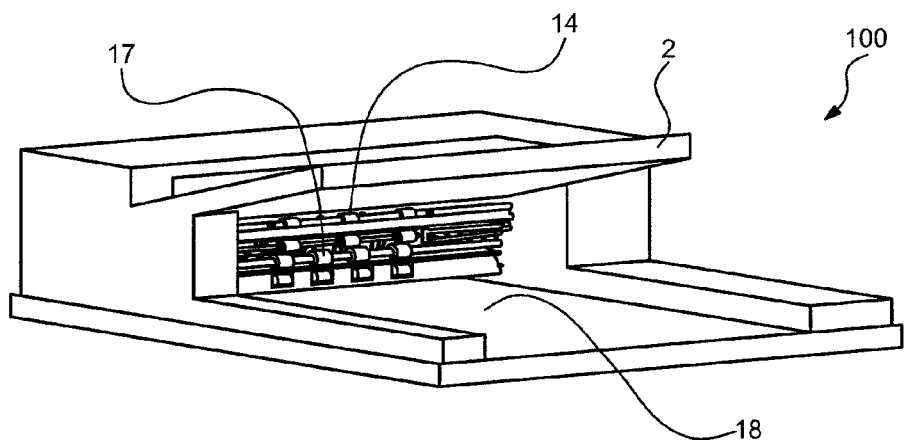
FIG. 1 is an outside view of a medium reversing apparatus 100.

FIG. 1 is an oblique view showing an outside of a medium reversing apparatus 100 in embodiment of the present invention. The medium reversing apparatus 100 comprises a medium tray 2 used for loading a multi-page original document; an ejecting roller 14 used to eject an original document or a part of the original document; an ejecting roller 17 used to eject an original document that has been reversed; and a stacker 18 used to load an ejected original document.

A medium reversing apparatus with the structure can read out image formed on one side or both sides of an original document and can also form image on one side or both sides of an original document. For example, when reading out image formed on both sides of an original document (also two-sided reading), a paper conveying roller (not shown) conveys an original document loaded in a medium tray 2 into a medium reversing apparatus 100. After one-sided image is read out by a reading apparatus (not shown), a part of an original document is ejected by an ejecting roller 14. Subsequently, the ejecting roller 14 rotates in an opposite direction and inputs the original document to the inside of medium reversing apparatus 100 again; the inputted original document is conveyed to a reversal route (not shown) for being reversed and is read out an image on the other side of it by a reading apparatus (not shown) and then ejected by an ejecting roller 17. The ejected original document is loaded on a stacker 18. In addition, when reading out an image on one side of an original document (one-sided reading), a paper conveying roller (not shown) inputs an original document loaded in medium tray 2 to the inside of medium reversing apparatus 100 and after one-sided image is read out by a reading apparatus (not shown) the original document is ejected by the ejecting roller 14. The ejected original document is loaded on the stacker 18.

As an example, an image reading apparatus 200 loading the medium reversing apparatus 100 is illustrated hereinafter. Image reading apparatus 200 is an image reading apparatus that can read out the image formed on original document. Further, the image reading apparatus 200 also includes an original document conveyance route and it is used in the following process: reading out an image on an original document which is inputted to apparatus; ejecting a part of the original document completing being read out; reversing the original document while it is conveyed back and then reading out an image on the back side of that read out before.

Figure 2:
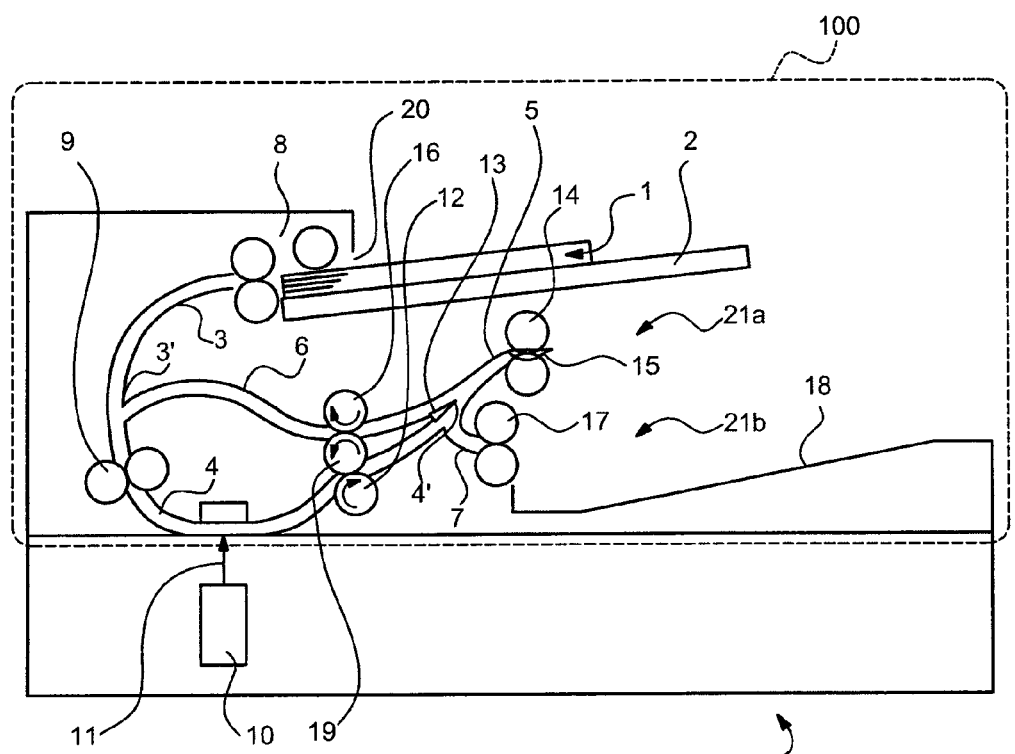
FIG. 2 is an explanatory diagram showing structure of an image reading apparatus 200.

As shown in FIG. 2 the original document conveyance route comprises such guide members as a conveyance route 3 used to guide an original document 1 from an original document input opening 20 to a branch point 3'; a conveyance route 4 used to guide the original document 1 from a branch point 3' to a branch point 4'; a conveyance route 5 used to guide the original document 1 from the branch point 4' to a medium ejection opening 21$a$; a conveyance route 6 used to guide the original document 1 from the branch point 4' to the branch point 3'; and a conveyance route 7 used to guide the original document 1 from the branch point 4' to a medium ejection opening 21$b$.

The following is a description in more details with respect to a structure of image reading apparatus 200 equipped with the original document conveyance route. Image reading apparatus 200 contains original document 1 whose image is ready to be read out and comprises a medium tray 2 used to load the multi-page original document 1; conveyance routes 3, 4, 5, 6, 7, used to guide the original document 1 to a conveyance route; a paper feeding roller section 8 used to feed the original document 1 from the medium tray 2 one page after another; conveying rollers 9, 12, 16, 19 used to convey the original document 1; CCD (charge coupled device) unit 10 used to read out an image on the original document 1, as a reading section; a route changing flap 13 used to change a conveyance route of original document 1; an ejecting roller 14 used to eject a part of the original document 1 or convey it back; a ribbing section 15 used as a bend forming section to bend the original document 1 from a clamp face clamped by the ejecting roller 14; an ejecting roller 17 used to eject a reversed original document 1; and a stacker 18 used to load the original document 1 which is ejected.

The original document 1 can be a flake-like paper-made medium and such images as characters, photos or the like are formed on a surface of original document 1.

The medium tray 2 is a tray used to load a multi-page original document whose images are ready to be read out in an overlapped way.

The paper feeding roller section 8 is equipped with a pickup roller used to pick up the original document 1 and other rollers. The paper feeding roller section 8 rotates based on power transmitted from a driving system (not shown). The pickup roller separates the original document 1 loaded in medium tray 2 one page after another. Rollers except the pickup roller input the original document 1 into the image reading apparatus 200 through the medium input opening 20.

The conveying roller 9 comprises a pair of rollers and is furnished in the midway of the conveyance route 4. The conveying roller 9 conveys the original document 1 conveyed here via the conveyance route 3 to a reading line 11 where CCD unit 10 reads out an image of the original document 1.

The CCD unit 10 comprises a CCD image sensor, lens or the like. Light that is emitted by a light source (not shown) is reflected on the original document 1 and the CCD image sensor can read out an image on the original document 1 by measuring the amount of light reflected from original document 1. The reading line 11 is located on the conveyance route 4 and is a reading location in which image of the original document 1 is read out by the CCD unit 10.

The conveying roller 12, conveying roller 16 and conveying roller 19 are furnished to rotate in a coordinated way, wherein if one conveying roller starts to rotate the other two will follow to rotate. That is to say, as shown in FIG. 2, the conveying roller 12 and the conveying roller 19 are furnished to contact each other on the conveyance route 4, and the conveying roller 16 and the conveying roller 19 are furnished to contact each other on the conveyance route 6. Consequently, when the conveying roller 9 rotates the original document 1 that is being conveyed towards the branch point 4' is clamped by the conveying roller 12 and the conveying roller 19 that are furnished on the conveyance route 4 for being conveyed. In addition, when the conveying roller 14 rotates in a contrary direction the original document 1 that is being conveyed towards branch point 3' is clamped by the conveying roller 16 and the conveying roller 19 that are furnished on the conveyance route 6 for being conveyed.

The route changing flap 13 is furnished on the branch point 4'. The route changing flap 13 guides the original document 1 conveyed here via the conveyance route 4 to the conveyance route 5. In addition, the route changing flap 13 can operate relying on such source of power (not shown) as electricity, magnetism or the like and guide the original document 1 which is conveyed back by the ejecting roller 14 to the conveyance route 6.

Figure 3:
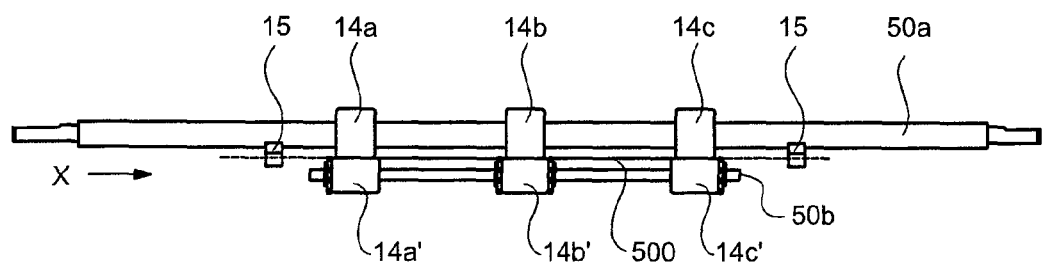
FIG. 3 is an explanatory diagram showing an ejecting roller 14.

As shown in FIG. 3, the ejecting roller 14 is furnished at the end of the conveyance route 5 and comprises a roller part 14a, a roller part 14b and a roller part 14c that are furnished making a rotation shaft 50a as their central axis and a roller part 14a', a roller part 14b' and a roller part 14c' that are furnished making a rotation shaft 50b as their central axis. The ejecting roller 14 ejects at least a part of the original document 1 that is guided via the conveyance route 5 through the medium ejection opening 21a. In addition, the ejecting roller 14 rotates in a contrary direction of ejection direction of the original document 1 and conveys a part of original document 1 being ejected back through the medium ejection opening 21a. When an image read out by CCD unit 10 is only formed on one side of the original document 1 (one-sided reading), the ejecting roller 14 ejects the original document 1 that is read out to the stacker 18 via the medium ejection opening 21a.

Figure 4:
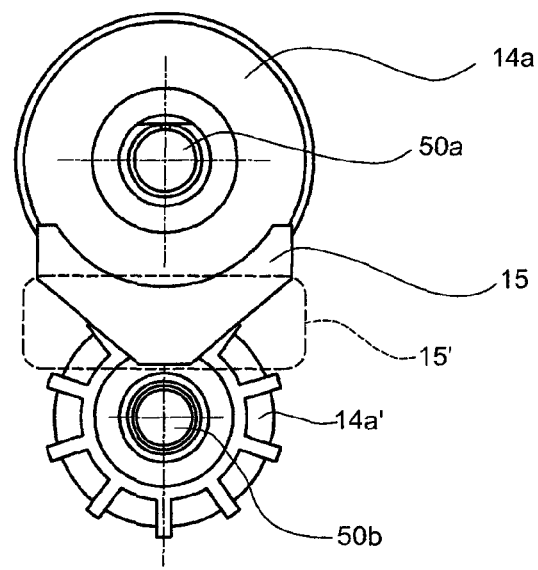
FIG. 4 is an explanatory diagram showing configuration relation of an ejecting roller 14 and a ribbing section 15.

The ribbing section 15 is furnished at the outside edge portions of the roller part 14a, the roller part 14b and the roller part 14c, that is, is furnished on both ends of the ejecting roller 14; and contacts a contact face, i.e., a clamp face 500 that is formed when the original document 1 contacts the roller part 14a, the roller part 14b and the roller part 14c and the roller part 14a', the roller part 14b' and the roller part 14c' in a vertical direction so as to enable original document 1 to be bent. FIG. 4 is an explanatory diagram that is presented when viewing in the direction of X shown in FIG. 3 and shows a location relation of the ejecting roller 14 and the ribbing section 15. An edge part 15' formed on one edge of the ribbing section 15 contacts the original document 1 so as to allow a good bend shape. There is no limit specific to the materials of the ribbing section 15 and that easily shaped and obtained can be used.

That is, the roller part 14a, the roller part 14b and the roller part 14c are rubber section that is formed from styrene-butadiene rubber, or the like; the roller part 14a', the roller part 14b' and the roller part 14c' are resin section that is formed from polyacetal resin, or the like; the ribbing section 15 is furnished on the rotation shaft 50a on which the rubber section is placed, and the ribbing section 15 projects toward the resin section i.e. toward one side of the roller part 14a', the roller part 14b' and the roller part 14c'.

The ejecting roller 17 is furnished at the end of the conveyance route 7 and comprises a plurality of rollers. The ejecting roller 17 ejects the original document 1 via the conveyance route 7 through the medium ejection opening 21b.

The stacker 18 is furnished under a medium ejection opening 21a from which the original document 1 is discharged during one-sided reading and a medium ejection opening 21b from which the original document 1 is discharged during two-sided reading and it is used to load the original document 1 that is discharged from medium ejection opening 21a or that is discharged from the medium ejection opening 21b.

Figure 5A:
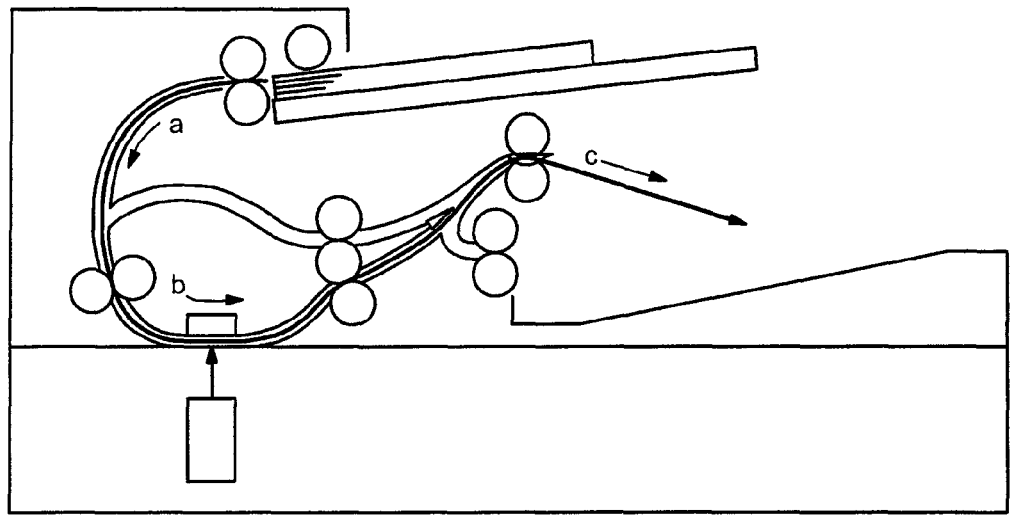
FIG. 5A is a first explanatory diagram showing the process of reading an original document while reversing a medium.
Figure 5B:
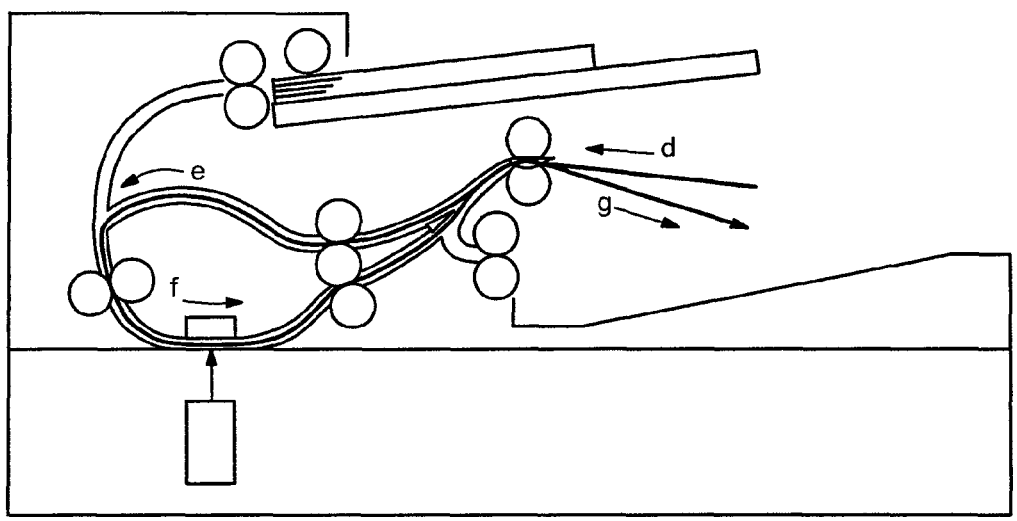
FIG. 5B is a second explanatory diagram showing the process of reading an original document while reversing a medium.
Figure 5C:
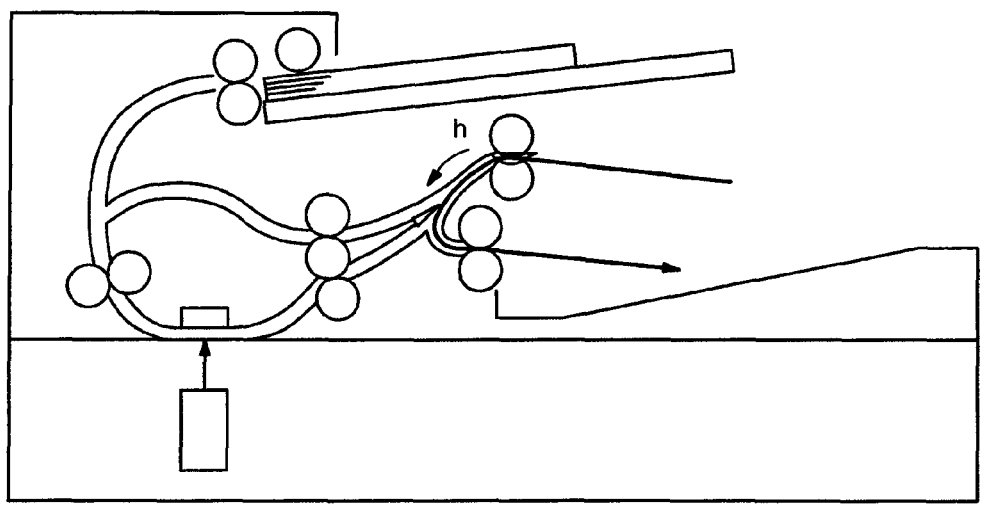
FIG. 5C is a third explanatory diagram showing the process of reading an original document while reversing a medium.

Based on FIGS. 5A-5C, a two-sided reading operation accompanied by medium reversing in the image reading apparatus 200 with the structure mentioned above is illustrated hereinafter. Here, two sides of original document 1 are called obverse side (represented by 1a) and reverse side (represented by 1b) respectively. In addition, it is assumed that in the medium tray 2 the multi-page original document 1 whose obverse side 1a faces up is loaded.

Firstly, after the user gives a reading instruction of reading out original document 1 to the image reading apparatus 200 through an operation section (not shown), the image reading apparatus 200 is driven by driving system (not shown); then the paper feeding roller section 8 rotates based on power transmitted from a driving system. And at the same time the conveying roller 9, conveying roller 12 and conveying roller 16 and the ejecting roller 14 and ejecting roller 17 start to rotate as well.

A pickup roller of paper feeding roller section 8 picks up the original document 1 loaded in the medium tray 2. The original document 1 that is picked up is conveyed by rollers except the pickup roller into the image reading apparatus 200 via the original document input opening 20 and then is conveyed to the conveying roller 9 via the conveyance route 3. (Paper Feeding Step as shown in FIG. 5A and following the direction of arrow a)

The original document 1 conveyed here by the paper feeding roller section 8, along with rotation of the conveying roller 9, is conveyed via conveyance route 4 to a location in which an image is read out by CCD unit 10, i.e., a reading line 11. CCD unit 10 reads out an image on an obverse side 1a of the original document 1 from a front 10 end of image formation to a back end of image formation. (First Reading Step as shown in FIG. 5A, following the direction of arrow b)

The original document 1 whose image on the obverse side 1a has completed being read out by CCD unit 10, along with rotation of the conveying roller 12, is conveyed via the conveyance route 5 to the ejecting roller 14. The ejecting roller 14 ejects a part of the original document 1 that is conveyed here by the conveying roller 12 for a while through the original document ejection opening 21a. (First Ejection Step as shown in FIG. 5A, following the direction of arrow c).

At the outside edge portion of the ejecting roller 14, the ribbing section 15 is furnished and used as a bend forming section to the bend original document 1. Due to a bend made by the ribbing section 15 and along with rotation of ejecting roller 12, it is difficult for a part of original document 1 that is ejected by the conveying roller 12 to hang down in the direction of gravity. Therefore, there will be smaller contact angle between a part of the original document 1 ejected via the original document ejection opening 21a and original document 1 that has been ejected to stacker 18. Hence, damage of original document 1, and original document load abnormality that is caused when a part of original document 1 that is ejected from the original document ejection opening 21a pushes out the original document 1 that has been ejected to stacker, or the like can be avoided.

After a back end of the original document 1 passes through route changing flap 13, the route changing flap 13 changes the original document 1 to the direction of the conveyance route 6. At the same time, the ejecting roller 14 rotates in the contrary direction of original document ejection. At this time, other rollers except the ejecting roller 14 do not rotate in the contrary direction. Through rotation of ejecting roller 14 in the contrary direction, the original document 1 is conveyed back via the conveyance route 5, and then is conveyed to the ejecting roller 16. (Conveying Back Step, as shown in FIG. 5B, following the direction of arrow d).

The original document 1 that is conveyed back, along with rotation of the ejecting roller 16, is conveyed via the conveyance route 6 and then is conveyed to the ejecting roller 9 after being guided to the conveyance route 4 again from the branch point 3'. At this time, the original document 1 has been reversed and the obverse side 1a becomes an upper side of the original document 1 again. (First Reversing Step, as shown in FIG. 5B, following the direction of arrow e).

The original document 1 that is conveyed here as rotation of the conveying roller 16, along with rotation of the conveying roller 9, is conveyed via the conveyance route 4 to a location in which an image is read out by CCD unit 10, i.e., reading line 11. The CCD unit 10 reads out an image on the reverse side 1b of the original document 1 from a back end of image formation to a front end of image formation. (Second Reading Step, as shown FIG. 5B, following the direction of arrow f).

The original document 1 whose image on the reverse side 1b completes being read out by CCD unit 10, along with rotation of conveying roller 12, is conveyed via the conveyance route 5 to the ejecting roller 14. The ejecting roller 14 ejects a part of the original document 1 conveyed here by the conveying roller 12 for a while, through the original document ejection opening 21a. (Second Ejection Step, as shown in FIGS. 5A-5C, following the direction of arrow g).

After a back end of original document 1 passes through the route changing flap 13, the route changing flap 13 changes a conveyance route of the original document 1 to the direction of conveyance route 7. At the same time, the ejecting roller 14 rotates in the contrary direction of original document ejection. Along with rotation of the ejecting roller 14 in the contrary direction the original document 1 is conveyed back via the conveyance route 7, and then is conveyed to the ejecting roller 17. (Second Reversing Step, as shown in FIG. 5B, following the direction of arrow h).

After the Second Reversing Step, the reverse side 1b of the original document 1 becomes an upper side again and along with rotation of the ejecting roller 17, the original document 1 is ejected via the original document ejection opening 21b to the stacker 18. On the basis of the above-stated original document conveying operation, the image reading apparatus 200 reads out both sides of the original document 1 till all pages of the original document 1 that is loaded in the medium tray 2 completes being read out through repeated execution of reading accompanied by an operation of reversing the obverse side and reverse side of the original document 1.

The following is a description with respect to a one-sided reading to the original document 1. In the one-sided reading operation to the original document 1, Paper Feeding Step is the same with that involved in a two-sided reading operation.

The original document 1 that is conveyed here by the paper feeding roller section 8, along with rotation of conveying roller 9, is conveyed via the conveyance route 4 to a location in which an image is read out by CCD unit 10, i.e., a reading line 11. The CCD unit 10 reads out an image on the obverse side 1a of the original document 1 from a front end of image formation to a back end of image formation. (Reading Step, as shown in FIG. 5A, following the direction of arrow b).

The original document 1 whose image on the obverse side 1a has completed being read out by CCD unit 10, along with rotation of the conveying roller 12, is conveyed via the conveyance route 5 to the ejecting roller 14. The ejecting roller 14 ejects the original document 1 conveyed here by the conveying roller 12 to a stacker through the original document ejection opening 21a. (Ejection Step, as shown in FIG. 5A, following the direction of arrow c). On the basis of the original document conveying operation mentioned above the one-sided reading to the original document 1 is executed repeatedly, till all pages of original document 1 that is loaded in the medium tray 2 completes being read out.

Figure 6:
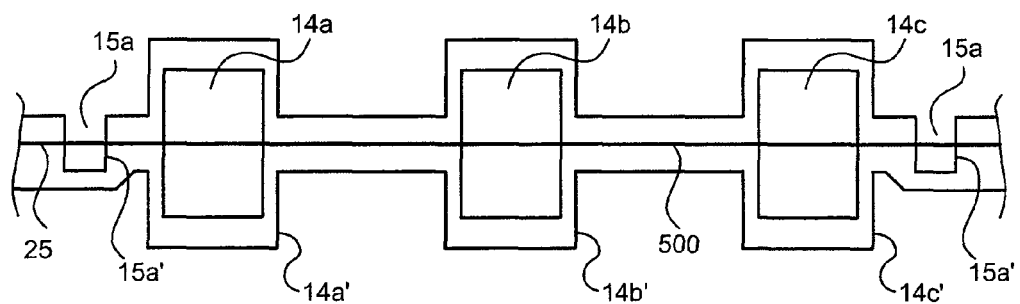
FIG. 6 is an explanatory diagram showing the configuration relation of an ejecting roller 14 and a ribbing section 15.

The following is a detailed description with respect to a specific shape of the ribbing section 15 used as a bend forming section. FIG. 6 is an explanatory diagram showing a configuration relation of the ejecting roller 14 and the ribbing section 15. As mentioned above the ejecting roller 14 comprises the roller part 14a, roller part 14b and roller part 14c that are furnished on a rotation shaft 50a with certain a distance between every two neighboring roller parts and can rotate freely, and the roller part 14a', roller part 14W and roller part 14c' that are furnished on a rotation shaft 50b with certain a distance between every two neighboring roller parts and can rotate freely. The roller part 14a and roller part 14a' are pressed to contact each other relying on certain a pressure. The roller part 14b and roller part 14b', and roller part 14c and roller part 14c' are pressed to contact each other relying on certain a pressure as well.

Rotation shaft 50a and rotation shaft 50b are furnished opposite to each other. The two rotation axes (rotation shaft 50a and rotation shaft 50b) or either of them (rotation shaft 50a or rotation shaft 50b) can be connected with the driving system (not shown) and rotate relying on driving force transmitted from this driving system.

One end of ribbing section 15 is equipped with a rib 15a in which 15a' is formed. The rib 15a is furnished at the outside edge portion of the roller part 14a and the roller part 14c respectively. In addition, a height of location on which ribbing section 15 contacts the original document 1 is furnished different from that of clamp face 500 formed when the original document 1 is clamped by the ejecting roller 14. As shown in FIG. 6 the location on which ribbing section 15 contacts original document 1 is furnished under the clamp face 500.

Figure 7:
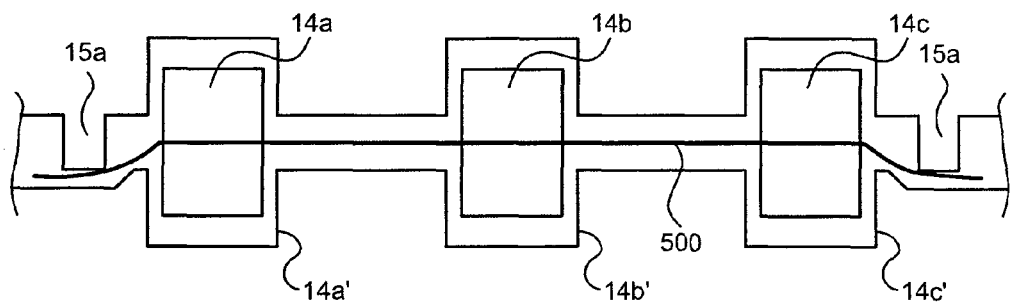
FIG. 7 is an explanatory diagram showing a bend shape of spread original document in the direction of lateral side of clamp face 500 after being bent by a ribbing section 15.
Figure 8:
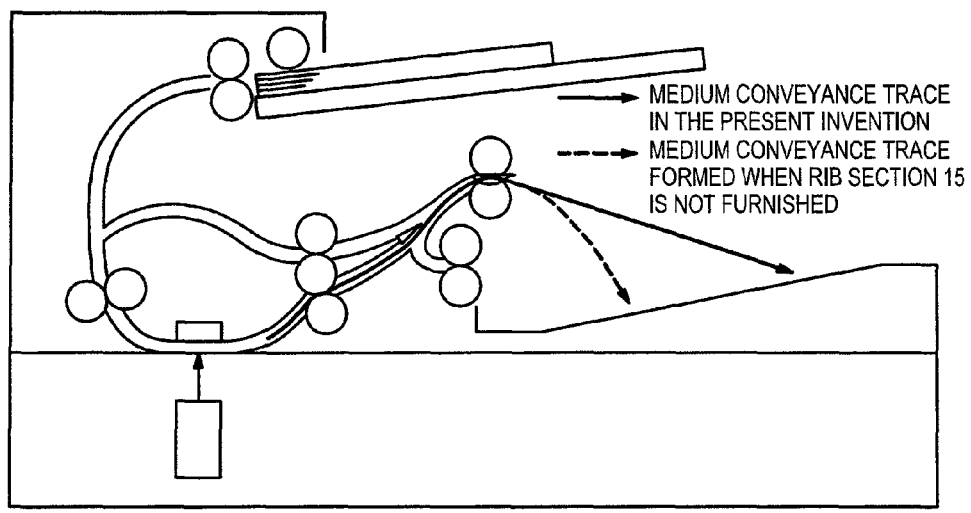
FIG. 8 is an explanatory diagram showing differences with a conventional technology.

FIG. 7 is an explanatory diagram showing a bend shape of the spread original document in the direction of lateral side of clamp face 500 of the original document 1 clamped by the ejecting rollers 14a-14c and the ejecting rollers 14a'-14c' after being bent by the ribbing section 15. As shown in FIG. 8, after the original document 1 is bent at its two ends of lateral side, a front part of the original document 1 that is ejected from medium ejection opening 20a can be prevented from hanging down in the direction of gravity.

Figure 9:
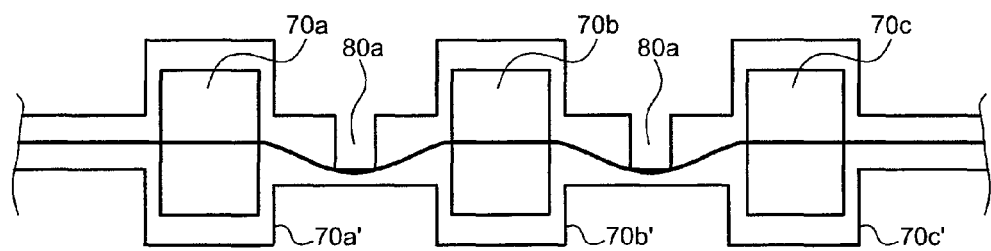
FIG. 9 is an explanatory diagram showing a bend forming component on the basis of a conventional technology.

As a method to bend the original document 1 through its contact with ribbing section, a shape that is furnished between an ejecting roller 70a and an ejecting roller 70b and that is furnished between the ejecting roller 70b and an ejecting roller 70c can also be considered, as shown in FIG. 9.

Figure 10:
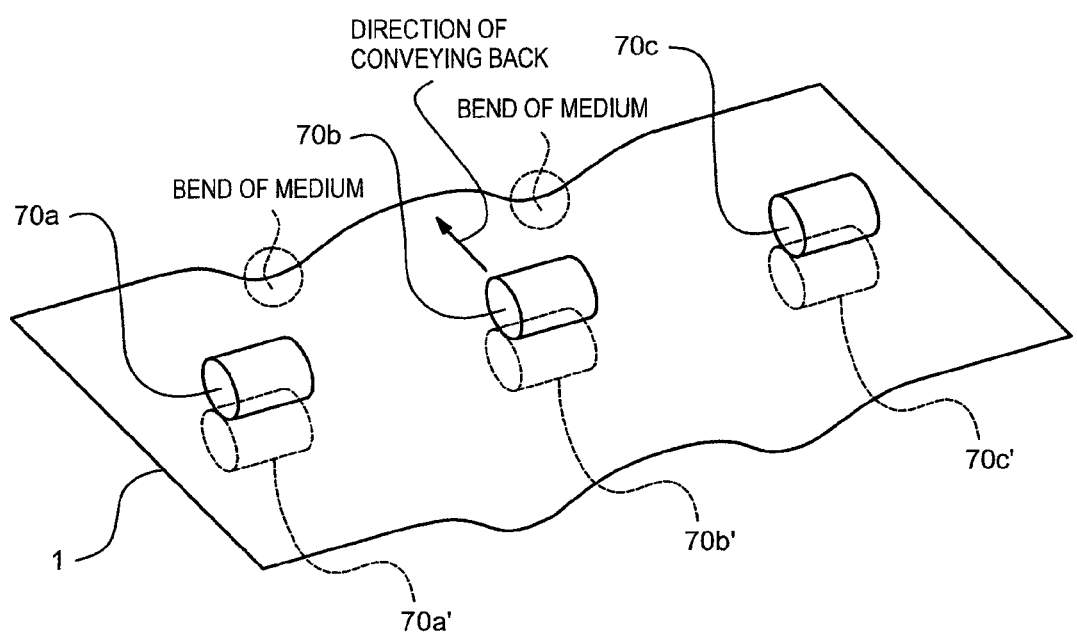
FIG. 10 is an explanatory diagram showing a bend forming component based on a conventional technology.

However, in the above-stated configuration relation of the ejecting roller 70 and the ribbing section 80, the bend formed by ribbing section 80a is formed between the ejecting roller 70a and the ejecting roller 70b, and between the ejecting roller 70b and the ejecting roller 70c. In this way, a bend shape of the original document 1 that is bent will be kept even after the original document 1 is ejected from the ejecting roller 70. Consequently, as shown in FIG. 10, when the ejecting roller 70 starts to rotate in a contrary direction for conveying the original document 1 back, the original document 1 keeps its bend state and such bend state possibly causes conveying abnormality of the original document 1.

In order to avoid the above-stated problem, a method of separating the ribbing section 80 from the ejecting roller 70 can be adopted when the ejecting roller section 70 rotates in a contrary direction. However, in this method, a separation structure of ribbing section 80 must be furnished and this will cause a structure complication of the image reading apparatus 200 and a production cost will be increased. Further, in order to achieve a moderate bend of the original document 1 there should be enough distance between ejecting rollers, and this will cause the scale-up of the image reading apparatus 200. Therefore, this method is unrealistic.

On the other hand, in the present invention, at one end of ribbing section 15 that is furnished on the side of roller part 14a and roller part 14c, the original document 1 is clamped by the roller part 14a and the roller part 14c and at the other end of ribbing section 15 the original document 1 is not clamped by the roller part 14a and the roller part 14c. Consequently when the ejecting roller 14 rotates in a contrary direction for conveying the original document 1 back, the original document 1 easily recovers its original shape from a bend shape and a danger of conveying abnormality will not be brought about. Accordingly, on the basis of the present invention, the front part of the original document 1 that is ejected from the medium ejection opening 20a can be prevented from hanging down and at the same time the conveying abnormality of the original document 1 that is caused when the ejecting roller 11 rotates in a contrary direction for conveying the original document 1 back can also be avoided.

Figure 11:
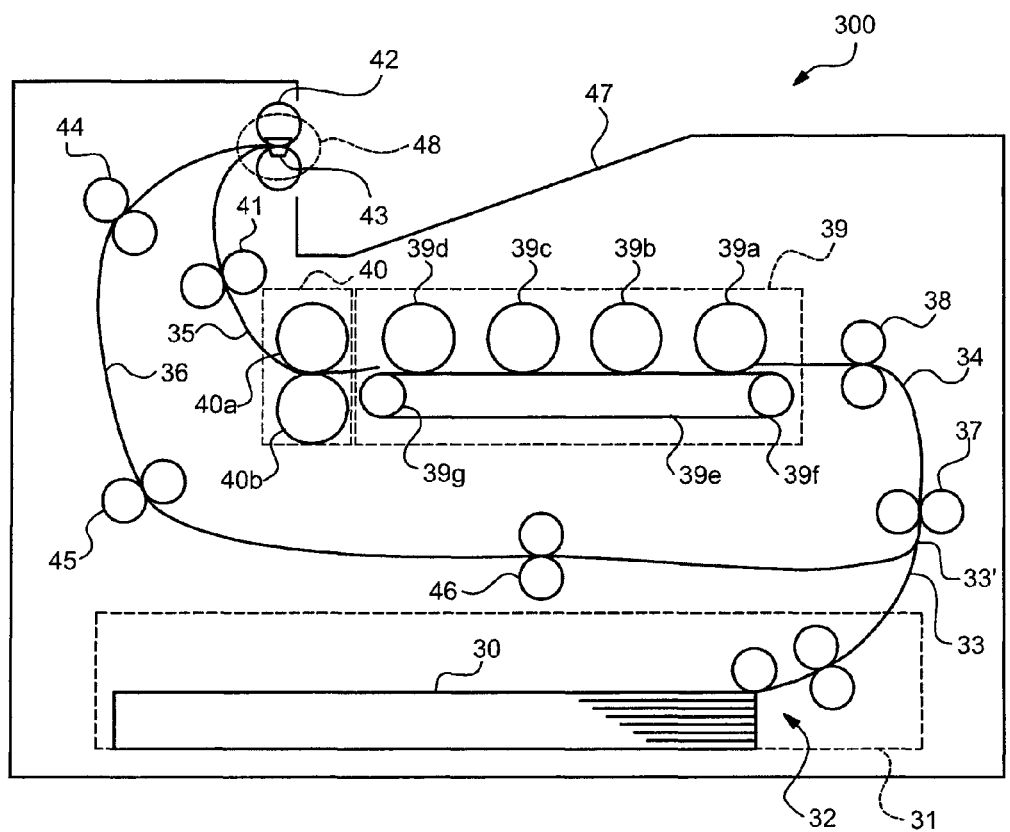
FIG. 11 is an explanatory diagram showing structure of an image forming apparatus 300.

The above-stated medium reversing structure that is used for reversing obverse side and reverse side of the original document 1 in an apparatus can apply to an image forming apparatus. The following is the detailed description with respect to an image forming apparatus 300 equipped with a medium reversing structure in the present invention on the basis of FIG. 11.

The Image forming apparatus 300 is an image forming apparatus that can form images on both sides of a record paper and be used as a medium and comprises a record paper 30 on which an image can be formed; a medium tray 31 that is configured on the bottom of image forming apparatus 300 and used for loading the record paper 30; a paper conveying roller section 32 that is furnished on top of the medium tray 31 and used to separate the record paper 30 from the medium tray 31 one page after another for paper feeding; conveyance routes 33, 34, 35, 36 that are used to guide the record paper 30 to a conveying target location; conveying rollers 37, 38, 41, 44, 45, 46 that are used for conveying the record paper 30; an image forming section 39 that is used to form a toner image on the record paper 30; a fixation section 40 that is used to fix a formed toner image and allow its fixation on the record paper 30; an ejecting roller 42 that is used to eject the record paper 30 or convey it back; a ribbing section 43 that is used as a bend forming section to bend the record paper 30 from a clamp face clamped by the ejecting roller 42; and a stacker 47 that is used to load the record paper 30 being ejected in an overlapped way.

The record paper 30 is a flake-like and paper-made medium and on its surface such images as characters, photos or the like can be formed.

The medium tray 31 is a tray and used to load the record paper 30 that is ready to be formed image.

The Paper conveying roller section 32 comprises a pickup roller used to pick up record paper 30 and other rollers. Paper conveying roller section 32 rotates relying on power transmitted from a driving system (not shown). The pickup roller separates the record paper 30 that is loaded in a medium tray one page after another. Other rollers except the pickup roller convey record paper 30 to a conveying roller 37.

The conveyance route 33 is a guide member used to guide record paper 30 from the paper conveying roller section 31 to the branch point 33'; the conveyance route 34 is a guide member used to guide record paper 30 from branch point 33' to image forming section 39;

the conveyance route 35 is a guide member used to guide the record paper 30 from the fixation section 40 to the ejecting roller 42; and the conveyance route 36 is a guide member used to guide the record paper 30 from the ejecting roller 42 to the branch point 33'.

The conveying roller 37 is furnished in the midway of the conveyance route 34, and comprises a pair of rollers. The conveying roller 37 conveys the record paper 30 that is conveyed here via the conveyance route 33 or the conveyance route 36 to the conveying roller 38.

The conveying roller 38 is furnished in the midway of the conveyance route 34 and comprises a pair of rollers. The conveying roller 38 conveys the record paper 30 that is conveyed here via the conveyance route 34 to the image forming section 39.

The image forming section 39 is furnished between the conveying roller 38 and the fixation section 40 and includes photosensitive drums 39a, 39b, 39c and 39d that are used to form toner image on a drum; a conveyer belt 39e that is used to convey the record paper 30 to the fixation section 40; driving rollers 39f and 39g that are used to stretch the conveyer belt 39e.

The fixation section 40 is furnished at a terminal of image forming section 39 and on the side of conveyance route 35 and comprises a fixation roller 40a that is used to heat and press the record paper 30; and a backup roller 40b that is furnished to be pressed to contact the fixation roller 40a.

The conveying roller 41 is furnished in the midway of the conveyance route 35 and comprises a pair of rollers. The conveying roller 41 conveys the record paper 30 that is conveyed here via the conveyance route 35 to the ejecting roller 42.

The ejecting roller 42 is furnished at a terminal of the conveyance route 35 and comprises a plurality of rollers. During two-sided printing firstly, the ejecting roller 42 ejects a part of the record paper 30 on whose one side an image has been formed, through the medium ejection opening 48; then, the ejecting roller 42 rotates towards a direction opposite to that of ejection for conveying a part of the record paper 30 that is ejected back from the medium ejection opening 48; lastly, the ejecting roller 42 ejects the record paper 30, on whose both sides the images has been formed, to stacker 47 through the medium ejection opening 48. In addition, during one-sided printing, the ejecting roller 42 ejects the record paper 30, on whose one side an image has been formed, to the stacker 47 directly through the medium ejection opening 48.

The ribbing section 43 that is furnished at the outside edge portion of the ejecting roller 42 contacts vertically a clamp face of the record paper 30 that is clamped by ejecting roller 42 and forms bend on record paper 30. There is no limit specific to materials of the ribbing section 43 and that easily shaped and obtained can be used. In addition, an edge part of ribbing section 43 should be round in shape and have a smooth surface so as to avoid damage to the record paper 30.

The conveying rollers 44, 45 and 46 are furnished in the midway of the conveyance route 36 and each of them comprises a pair of rollers. The conveying roller 41 conveys the record paper 30 that is conveyed back by ejecting roller 42 to the conveying roller 37.

The stacker 47 is furnished under a medium ejection opening 48 used for loading the record paper 30 that is ejected from the medium ejection opening 48.

The following is a description with respect to a two-sided image forming operation accompanied by medium reversing that is operated on record paper 30 in an image forming apparatus 300 with a structure mentioned above. Here, two sides of the record paper 30 are called obverse side (represented by 30a) and reverse side (represented by 30b) respectively. In addition, it is assumed that in medium tray 31 the multi-page record paper 30 whose obverse side 30a faces up is loaded.

Firstly, after user gives an image forming instruction to the image forming apparatus 300 through an operation section (not shown), the image forming apparatus 300 is driven by a driving system (not shown). The paper conveying roller section 32 rotates relying on power transmitted from a driving system. At the same time, conveying rollers 37, 38, 41, 44, 45, 46 and the ejecting roller 42 rotate as well.

The pickup roller in the paper conveying roller section 32 picks up the record paper 30 that is loaded in a medium tray. The record paper 30 that is picked up is conveyed by other rollers except the pickup roller to the conveying roller 37 via the conveyance route 33. (Paper Feeding Step)

The record paper 30 that is conveyed here by the paper conveying roller section 32, along with rotation of that conveying roller 37, is conveyed to the conveying roller 38 via the conveyance route 34. The record paper 30 that is conveyed here by the conveying roller 37, along with rotation of the conveying roller 38, is conveyed to the image forming section 39. At this time an upper side of record paper 30 is its reverse side 30b.

In the image forming section 39, the image forming apparatus 300 enables exposure sections (not shown) to form electronic-static latent images on the surface of photosensitive drums 39a, 39b, 39c, 39d on the basis of the image information received. The electronic-static latent images formed on the surfaces of photosensitive drums 39a, 39b, 39c, 39d are adhered toner by raster displaying section containing ink agents of various colors such as Magenta (M), Cyan (C), Yellow (Y), Black (B) or the like. In this way the toner images are formed. With respect to photosensitive drums 39a, 39b, 39c, 39d, each of them is pressed to contact a transfer roller (not shown) through the conveyor belt 39e. When the record paper 30 is conveyed through the photosensitive drums 39a, 39b, 39c, 39d, due to a bias voltage affixed to the transfer roller, the toner images on surfaces of drums 39a, 39b, 39c, 39d are transferred on the record paper 30. (First Image Formation Step)

The record paper 30, on whose reverse 30b the toner image has been transferred, is conveyed to the fixation 40 for being pressed and heated by the fixation roller 40a and backup roller 40b. The record paper 30, whose toner images are fixed, is conveyed to the conveying roller 41 via the conveyance route 35.

The record paper 30 that is conveyed here from the fixation section 40, along with rotation of the conveying roller 41 is conveyed to the ejecting roller 42. The ejecting roller 42 ejects a part of the record paper 30 that is conveyed here by the conveying roller 41 from the original document ejection opening 48 for a while. (First Ejection Step)

The ribbing section 43 are furnished at the outside edge portion of the ejecting roller 42 and used to form a bend on the record paper 30. Due to a bend shape formed by the ribbing section 43, it is difficult for a part of the record paper 30 ejected to hang down in the direction of gravity along with rotation of the conveying roller 42. Therefore, there will be smaller contact angle between a part of the record paper 30 ejected from the original document ejection opening 48 and the record paper 30 that has been ejected to the stacker 47. Hence, a damage of record paper 30, and original document load abnormality that is caused when a part of the record paper 30 ejected from original document ejection opening 48 pushes out that record paper that has been ejected to the stacker 47, or the like can be avoided.

After a part of the record paper 30 is ejected from the medium ejection opening 48, the ejecting roller 42 rotates to a direction opposite to ejection of the record paper. Along with rotation of the ejecting roller 42 in the contrary direction, the record paper 30 is conveyed back via the conveyance route 36 to the conveying roller 44 (Conveying Back Step)

The record paper 30 that is conveyed back, along with rotation of the conveying roller 44, is conveyed via the conveyance route 36 to the conveying roller 45. Then along with rotation of the conveying roller 45, the record paper 30 is conveyed to the conveying roller 46. At this time, an upper face of the record paper 30 is reverse side 30b.

The record paper 30 that is conveyed here by the conveying roller 45, along with rotation of the conveying roller 46, is conveyed via the branch point 33' to the conveying roller 37. At this time, an upper face of record paper is obverse side 30a. (Reversing Step)

The Record paper 30 that is conveyed here by the conveying roller 46, along with rotation of the conveying roller 37, is conveyed via the conveyance route 34 to the conveying roller 38. The record paper 30 that is conveyed here by the conveying roller 37, along with rotation of the conveying roller 38 is conveyed to the image forming section 39. On an obverse side 30a of record paper 30, an image forming process that is illustrated in the First Image Formation Step is executed.

The record paper 30, on whose obverse side 30a a toner image is transferred, is conveyed to the fixation section 40 for being pressed and heated by the fixation roller 40a and backup roller 40b. The record paper 30, on whose surface the toner image has been fixed, is conveyed to the conveying roller 41 via the conveyance route 35.

The record paper 30 that is conveyed here from the fixation section 40, along with rotation of the conveying roller 41, is conveyed to the ejecting roller 42. The ejecting roller 42 conveys the record paper 30 that is conveyed here by the conveying roller 41 to the stacker 47 via the original document ejection opening 48. (Second Ejection Step)

In this case, a medium reversing mechanism is not only used in the image reading apparatus 200 but also in the image forming apparatus 300. This medium reversing mechanism can apply to form images on both sides of the record paper 30.

The following is a description with respect to an operation of image formation on one side of the record paper 30. The Image Formation Step involved in forming image on one side of record paper 30 is the same as the First Image Formation Step involved in two-sided image formation.

Firstly, after a user gives an image forming instruction to image forming apparatus 300 through an operation section (not shown), the image reading apparatus 300 is driven by a driving system (not shown). The paper conveying roller section 32 rotates relying on power transmitted from a driving system. At the same time, conveying rollers 37, 38, 41, 44, 45, 46 and ejecting roller 42 rotate as well.

The pickup roller in the paper conveying roller section 32 picks up the record paper 30 that is loaded in medium tray 31. The record paper 30 that is picked up is conveyed by other rollers except the pickup roller to the conveying roller 37 via the conveyance route 33. (Paper Feeding Step)

The record paper 30 that is conveyed here by the paper conveying roller section 32, along with rotation of conveying roller 37, is conveyed to the conveying roller 38 via the conveyance route 34. The record paper 30 that is conveyed here by the conveying roller 37, along with rotation of conveying roller 38, is conveyed to the image forming section 39. At this time, an upper side of record paper 30 is a reverse side 30b.

In the image forming section 39, the image forming apparatus 300 enables an exposure section (not shown) to form electronic-static latent image on the surfaces of Photosensitive drums 39a, 39b, 39c, 39d on the basis of the image information received. The electronic-static latent images formed on the surfaces of Photosensitive drums 39a, 39b, 39c, 39d are adhered toner by raster displaying section containing ink agents of various colors such as Magenta (M), Cyan (C), Yellow (Y), Black (B) or the like. In this way the toner images are formed. With respect to photosensitive drums 39a, 39b, 39c, 39d, each of them is pressed to contact the transfer roller (not shown) through the conveyor belt 39e. When record paper 30 is conveyed through the photosensitive drums 39a, 39b, 39c, 39d, due to a bias voltage affixed to the transfer roller, toner images on surfaces of drums 39a, 39b, 39c, 39d are transferred on the record paper 30. (Image Formation Step)

The record paper 30, on whose reverse side 30b toner image is transferred, is conveyed to the fixation section 40 for being pressed and heated by the fixation roller 40a and the backup roller 40b. The record paper 30, whose toner image has been fixed, is conveyed to the conveying roller 41 via the conveyance route 35.

The record paper 30 that is conveyed here from fixation section 40, along with rotation of the conveying roller 41, is conveyed to the ejecting roller 42. The ejecting roller 42 conveys the record paper 30 conveyed here by the conveying roller 41 to the stacker 47 through the original document ejection opening 48.

The ribbing section 43 is furnished at the outside edge portion of the ejecting roller 42 and used to form bend on the record paper 30. Due to a bend shape formed by ribbing section 43, it is difficult for a part of the record paper 30 being ejected to hang down along with rotation of the conveying roller 42 in the direction of gravity. Therefore, there will be smaller contact angle between a part of the record paper 30 that is ejected from the original document ejection opening 48 and the record paper 30 that has been ejected to the stacker 47. Hence, a damage of record paper 30, and original document load abnormality that is caused when a part of the record paper 30 ejected from original document ejection opening 48 pushes out record paper that has been ejected to stacker 47, or the like can be avoided.

In comparison with the embodiment 1, in conventional technology, In general, when a front part of medium is ejected from the medium ejection opening of the medium reversing apparatus, the front part of medium hangs down in the direction of gravity due to its dead weight and runs into an ejection tray. Therefore, problems such as medium damage and load abnormality caused by that medium ejected from medium ejection opening pushes out medium which has been ejected into ejection tray or the like will occur.

However, because embodiment 1 of the present invention adopts such structure as stated above, so it is possible to obtain the following effect.

That is, as mentioned above, according to Embodiment 1 of the present invention, a medium damage caused because a front part of medium hangs down in the direction of gravity due to its dead weight after it is ejected from medium ejection opening can be prevented. Moreover, medium load abnormality caused when medium ejected from a medium ejection opening pushes out a medium that has been ejected to an ejection tray, or the like can be avoided as well. Further, according to Embodiment 1 a bend shape of medium can easily be lifted. Consequently, when an ejecting roller conveys a medium back the medium can be conveyed back smoothly without being jammed.

Embodiment 2

Image forming apparatus 200 in Embodiment 2 is much the same with that in Embodiment 1 in structure. Therefore, a part that is the same with that involved in Embodiment 1 will only be specified 'THE SAME', without further illustration. In the image reading apparatus 200 of the present embodiment, a ribbing section 15 is furnished at the outside edge portion of the ejecting roller 14 and can rotate freely to a direction of an original document conveyance and contact vertically a clamp face of the original document 1 that is clamped by the ejecting roller 14, in order to form a bend on the original document 1.

Figure 12:
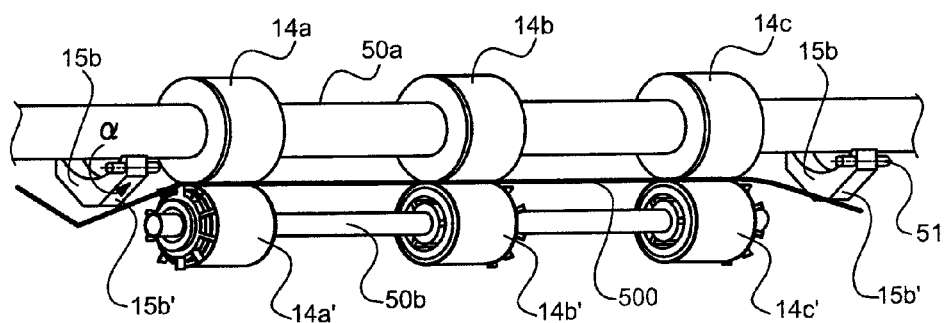
FIG. 12 is an explanatory diagram showing a location relation of a ribbing section 15$b$ and ejecting rollers 14$a$, 14$b$ and 14$c$.

The following is a detailed description with respect to the ribbing section 15b. FIG. 12 is an explanatory diagram showing a location relation of ribbing section 15b and ejecting rollers 14a, 14b and 14c.

The ribbing section 15b is furnished at the outside edge portion of spread original document in the bilateral sides of a clamp face 500 of the original document 1 that is clamped by ejecting rollers 14a-14c and ejecting rollers 14a'-14c' and contacts vertically clamp face 500 for bending original document 1. The ribbing section 15b is very light in weight and as an edge part 15b' comprises an arch section, whose degree of curve is slightly the same with that of circumference of rotation shaft 50a. Further, on one end of ribbing section 15b a rotation branch point 51 is furnished and it can rotate freely in the direction of conveying of the original document 1. The rotation branch point 51 is furnished on a conveyance route that is not shown in the figure.

Figure 13:
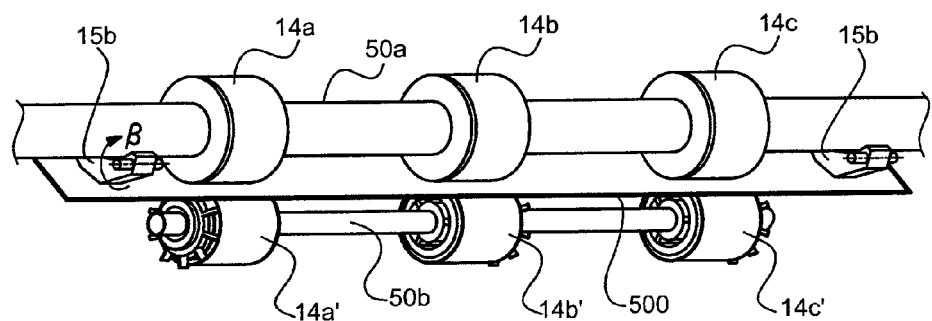
FIG. 13 is an explanatory diagram showing a location relation of a ribbing section 15$b$ and ejecting rollers 14$a$, 14$b$ and 14$c$.

In the image reading apparatus 200 with a structure mentioned above when a part of the original document 1 ejected by ejecting roller 14, the edge part 15b' contacts original document 1. Through a friction effect between the original document 1 and the edge part 15b', ribbing section 15b produces linkage with an ejection operation of the original document 1 and rotates in the direction of .alpha. with an axis of rotation branch point 51, keeping on a location where it contacts the original document 1. Further, when the original document 1 is conveyed back by the ejecting roller 14, as shown in FIG. 13, as friction effect between original document 1 and edge part 15b', the ribbing section 15b produces linkage with ejection operation of original document 1 and rotates in the direction of .beta. with an axis of rotation branch point 51. Consequently, the ribbing section 15b retreat to its upper side in order to correct bend shape of medium. Although the ribbing section 15b is still located above the original document 1, because it is very light in weight, the original document 1 will not be bent again. Therefore, the original document 1 can easily recover from its bend shape.

In the image reading apparatus 200 with the ribbing section 15b mentioned above, an execution of image reading operation accompanied by medium reversing can be the same with that in Embodiment 1.

As discussed above, besides having effect of Embodiment 1, the image-reading apparatus 200 based on Embodiment 2 can correct a bend shape of original document 1 effectively when it is conveyed back because the ribbing section 15b retreats to the predetermined location when the original document 1 is conveyed back, Embodiment 3

The image forming apparatus 200 in Embodiment 3 is much the same with that in Embodiment 1 in structure, therefore, a part that is the same with that involved in Embodiment 1 is only specified 'THE SAME', without further illustrations. In image reading apparatus 200 of the present embodiment, the ribbing section 15c is equipped with a rotation roller 25 that can rotate freely from a rotation rack 23 that is furnished on a rotation shaft 50a. The rotation shaft 25 contacts the original document 1 vertically on the clamp face 500 that is clamped by ejecting roller 14 in order to form bend on the original document 1.

Figure 14:
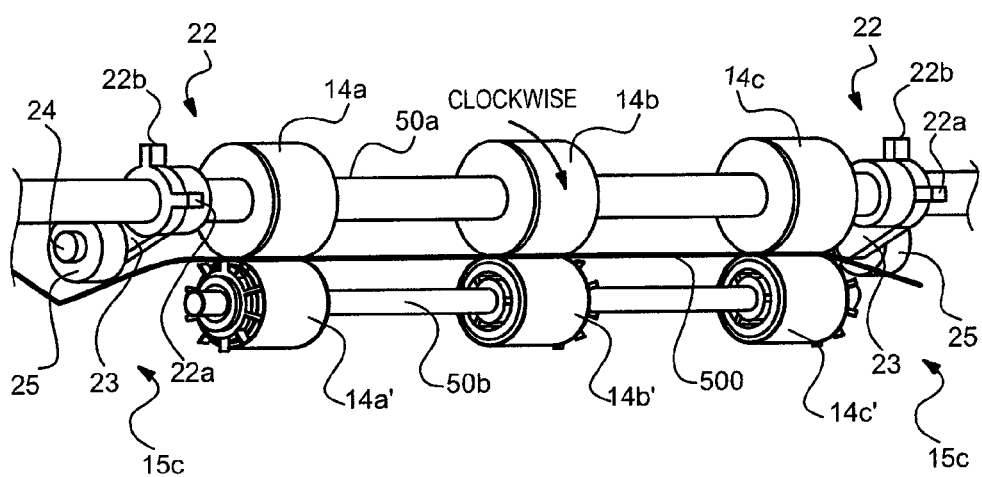
FIG. 14 is an explanatory diagram showing a location relation of a ribbing section 15$c$ and ejecting rollers 14$a$, 14$b$ and 14$c$.

The following is a detailed description with respect to the ribbing section 15c. FIG. 14 is an explanatory diagram showing a location relation of ribbing section 15c and ejecting rollers 14a, 14b, 14c.

The ribbing section 15c comprises a rotation rack 23 that is furnished on the rotation shaft 50a through a torque limiter 22; a rotation shaft 24 that is furnished on the rotation rack 23; and a rotation roller 25 which can rotate freely, wherein a rotation shaft 24 serves as its fulcrum.

There is no limitation specific to the torque limiter 22 and torque limiter with spring-type, needle-type, or the like can be used. Further, on rotation rack 23 a limit section 22a and a limit section 22b are furnished and they are used to control an angle of rotation and contact conveyance route (not shown). There is no limit specific to materials of the rotation roller 25 and that easily shaped and obtained can be used. The rotation roller 25 should be round in shape and have a smooth surface in order to avoid damage to the original document 1.

In the image reading apparatus 200 with the structure mentioned above, when the ejecting roller 14 ejects a part of the original document 1, the rotation rack 23 through the torque limiter 22 rotates counterclockwise to a location where the limit section 22a contacts a conveyance route. In this case, the rotation roller 25 comes to a location where it contacts the original document 1. After the limit section 22a contacts the conveyance route, the torque limiter 22 rotates idle in order to keep a location of the rotation roller 25 and rotation rack 23.

On the other hand, when the ejecting roller 14 conveys the original document 1 back, the rotation rack 23 through the torque limiter 22 rotates clockwise to a location where the limit section 22a contacts a conveyance route. In this case, the rotation roller 25 retreats to a location where it does not contact the original document 1. After the limit section 22a contacts conveyance route, the torque limiter 22 rotates idle in order to keep a location of the rotation roller 25 and rotation rack 23.

In image reading apparatus 200 with the ribbing section 15c mentioned above, an execution of image reading operation accompanied by medium reversing can be the same with that in Embodiment 1.

As discussed above, besides having effect of Embodiment 1, the image-reading apparatus 200 based on Embodiment 3 can correct a bend shape of the original document 1 effectively when it is conveyed back because the ribbing section 15 retreats to the predetermined location when the original document 1 is conveyed back. In addition, the rotation roller 25 does not contact the original document 1 in order to alleviate a friction sound caused by the rotation roller 25 and the original document 1.

The above is a description with respect to embodiments of the present invention, taking image forming apparatus as an example for illustration. However, the present invention is not limited to the description mentioned above and can also make proper changes within a scope of the outlines mentioned in present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A medium reversing apparatus that conveys a sheet-like medium back and reverses obverse side and reverse side of the medium, comprising:
    a medium ejection opening from which at least a part of the medium is ejected; and
    a medium conveyance mechanism that at least ejects the part of the medium from the medium ejection opening and conveys the medium back the medium conveyance mechanism including:
        a rotation member that conveys the medium in a first direction and in a second direction, the second direction being opposite to the first direction; and
        a bend forming section that bends the medium clamped by the rotation member, wherein the rotation member has a plurality of pairs of rollers, and the bend forming section projects from one of the pairs of rollers to another of the pairs of rollers.

2. The medium reversing apparatus according to claim 1, wherein the pairs of rollers include a first roller having a rubber section and a second roller having a resin section.

3. The medium reversing apparatus according to claim 1, wherein the rotation member rotates along a first rotation direction when ejecting the medium from the medium ejection opening and when conveying the medium back from the medium ejection opening, the rotation member rotates along a second rotation direction.

4. The medium reversing apparatus according to claim 1 further comprising:
    an image forming section that forms an image on the medium.

5. The medium reversing apparatus according to claim 1 further comprising:
    a reading section used to read an image formed on the medium.

6. The medium reversing apparatus according to claim 1, wherein the bend forming section is set at an outside edge portion along an axis direction of the roller section.

7. The medium reversing apparatus according to claim 1, wherein the bend forming section is a rib that can contact the medium when the medium is ejected from the medium ejection opening.

8. The medium reversing apparatus according to claim 1, wherein the bend forming section is a rotation roller that can contact the medium when the medium is ejected from the medium ejection opening.

9. The medium reversing apparatus according to claim 1, wherein the bend forming section is a finisher that is furnished to advance to a predetermined contact location so as to contact vertically with a clamp face of the medium when the medium is ejected from the medium ejection opening; and to retreat from the contact location when the medium is conveyed back.

10. A medium reversing apparatus that conveys a sheet-like medium back and reverses obverse side and reverse side of the medium, comprising:
   a medium ejection opening from which at least a part of the medium is ejected; and
   a medium conveyance mechanism that at least ejects the part of the medium from the medium ejection opening and conveys the medium back the medium conveyance mechanism including:
      a rotation member that conveys the medium in a first direction and in a second direction, the second direction being opposite to the first direction; and
      a bend forming section that bends the medium clamped by the rotation member, wherein the medium conveyance mechanism has a shaft section, and a roller section set around the shaft section, and the bend forming section is set at the shaft section.

11. The medium reversing apparatus according to claim 10, wherein the bend forming section is set at an outside edge portion along an axis direction of the roller section.

12. The medium reversing apparatus according to claim 10, wherein the bend forming section is a rib that can contact the medium when the medium is ejected from the medium ejection opening.

13. The medium reversing apparatus according to claim 10, wherein the bend forming section is a rotation roller that can contact the medium when the medium is ejected from the medium ejection opening.

14. The medium reversing apparatus according to claim 10, wherein the bend forming section is a finisher that is furnished to advance to a predetermined contact location so as to contact vertically with a clamp face of the medium when the medium is ejected from the medium ejection opening; and to retreat from the contact location when the medium is conveyed back.

15. The medium reversing apparatus of claim 10 further comprising:
   an image forming section that forms an image on the medium.

16. The medium reversing apparatus of claim 10 further comprising:
   a reading section used to read an image formed on the medium.

17. The medium reversing apparatus according to claim 10, wherein the rotation member has a plurality of pairs of rollers and the pairs of rollers include a first roller having a rubber section and a second roller having a resin section.

18. The medium reversing apparatus according to claim 10, wherein the rotation member rotates along a first rotation direction when ejecting the medium from the medium ejection opening and when conveying the medium back from the medium ejection opening, the rotation member rotates along a second rotation direction.

19. A medium reversing apparatus that conveys a sheet-like medium back and reverses obverse side and reverse side of the medium comprising:
   a first medium ejection opening from which at least a part of the medium is ejected;
   a second medium ejection opening from which the medium is ejected to a loading section for loading the medium; and
   a medium conveyance mechanism that at least ejects the part of the medium from the first medium ejection opening and conveys the medium back, the medium conveyance mechanism including:
      a rotation member that conveys the medium in a first direction and in a second direction, the second direction being opposite to the first direction; and
      a bend forming section that bends the medium clamped by the rotation member, wherein the rotation member has a plurality of pairs of rollers, and the bend forming section projects from one of the pairs of rollers to another of the pairs of rollers.

20. The medium reversing apparatus according to claim 19, wherein the pairs of rollers include a first roller having a rubber section and a second roller having a resin section.

21. The medium reversing apparatus of claim 19 further comprising:
   an image forming section that forms an image on the medium.

22. The medium reversing apparatus of claim 19 further comprising:
   a reading section used to read an image formed on the medium.

23. The medium reversing apparatus according to claim 19, wherein the bend forming section is set at an outside edge portion along an axis direction of the roller section.

24. The medium reversing apparatus according to claim 19, wherein the bend forming section is a rib that can contact the medium when the medium is ejected from the first medium ejection opening.

25. The medium reversing apparatus according to claim 19, wherein the bend forming section is a rotation roller that can contact the medium when the medium is ejected from the first medium ejection opening.

26. The medium reversing apparatus according to claim 19, wherein the bend forming section is a finisher that is furnished to advance to a predetermined contact location so as to contact vertically with a clamp face of the medium when the medium is ejected from the first medium ejection opening; and to retreat from the contact location when the medium is conveyed back.

27. A medium reversing apparatus that conveys a sheet-like medium back and reverses obverse side and reverse side of the medium comprising:
   a first medium ejection opening from which at least a part of the medium is ejected;
   a second medium ejection opening from which the medium is ejected to a loading section for loading the medium; and
   a medium conveyance mechanism that at least ejects the part of the medium from the first medium ejection opening and conveys the medium back, the medium conveyance mechanism including:
      a rotation member that conveys the medium in a first direction and in a second direction, the second direction being opposite to the first direction; and a bend forming section that bends the medium clamped by the rotation member, wherein the rotation member rotates along a first rotation direction when ejecting the medium from the first medium ejection opening and when conveying the medium back from the first medium ejection opening, the rotation member rotates along a second rotation direction.

28. The medium reversing apparatus according to claim 27, wherein the bend forming section is a rib that can contact the medium when the medium is ejected from the first medium ejection opening.

29. The medium reversing apparatus according to claim 27, wherein the bend forming section is a rotation roller that can contact the medium when the medium is ejected from the first medium ejection opening.

30. The medium reversing apparatus according to claim 27, wherein the bend forming section is a finisher that is furnished to advance to a predetermined contact location so as to contact vertically with a clamp face of the medium when the medium is ejected from the first medium ejection opening; and to retreat from the contact location when the medium is conveyed back.

31. The medium reversing apparatus of claim 27 further comprising:
an image forming section that forms an image on the medium.

32. The medium reversing apparatus of claim 27 further comprising:
a reading section used to read an image formed on the medium.

33. A medium reversing apparatus that conveys a sheet-like medium back and reverses obverse side and reverse side of the medium comprising:
a first medium ejection opening from which at least a part of the medium is ejected;
a second medium ejection opening from which the medium is ejected to a loading section for loading the medium; and
a medium conveyance mechanism that at least ejects the part of the medium from the first medium ejection opening and conveys the medium back, the medium conveyance mechanism including:
a rotation member that conveys the medium in a first direction and in a second direction, the second direction being opposite to the first direction; and
a bend forming section that bends the medium clamped by the rotation member, wherein the medium conveyance mechanism has a shaft section, and a roller section set around the shaft section, and the bend forming section is set at the shaft section.

34. The medium reversing apparatus according to claim 33, wherein the bend forming section is set at an outside edge portion along an axis direction of the roller section.

35. The medium reversing apparatus of claim 33 further comprising:
an image forming section that forms an image on the medium.

36. The medium reversing apparatus of claim 33 further comprising:
a reading section used to read an image formed on the medium.

37. The medium reversing apparatus according to claim 33, wherein the rotation member has a plurality of pairs of rollers and the pairs of rollers include a first roller having a rubber section and a second roller having a resin section.

38. The medium reversing apparatus according to claim 33, wherein the bend forming section is a rib that can contact the medium when the medium is ejected from the first medium ejection opening.

39. The medium reversing apparatus according to claim 33, wherein the bend forming section is a rotation roller that can contact the medium when the medium is ejected from the first medium ejection opening.

40. The medium reversing apparatus according to claim 33, wherein the bend forming section is a finisher that is furnished to advance to a predetermined contact location so as to contact vertically with a clamp face of the medium when the medium is ejected from the first medium ejection opening; and to retreat from the contact location when the medium is conveyed back.

* * * * *